United States Patent [19]

Tennent

[11] 3,914,509

[45] Oct. 21, 1975

[54] CHEMICAL MODIFICATION OF THE SURFACE OF PYROLYTIC GRAPHITE

[75] Inventor: Howard G. Tennent, Kennett Square, Pa.

[73] Assignee: Hercules Incorporated, Wilmington, Del.

[22] Filed: Nov. 20, 1973

[21] Appl. No.: 417,686

[52] U.S. Cl. ............... 428/408; 427/113; 427/123; 427/299; 427/399; 428/457; 204/195 H
[51] Int. Cl.$^2$ .................... C25B 11/14; C25B 11/18
[58] Field of Search............ 117/228, DIG. 11, 227, 117/118, 160 R, 169 R, 213, 47 R; 204/195 H

[56] References Cited
UNITED STATES PATENTS

| | | | |
|---|---|---|---|
| 3,193,987 | 7/1965 | Manes et al................. | 117/160 R X |
| 3,479,299 | 11/1969 | Rivin et al. ...................... | 423/460 X |
| 3,479,300 | 11/1969 | Rivin et al. ...................... | 423/460 X |

*Primary Examiner*—Ralph S. Kendall
*Assistant Examiner*—Harris A. Pitlick
*Attorney, Agent, or Firm*—Edith A. Rice; John W. Whitson

[57] ABSTRACT

This invention relates to chemically modifying the surface of pyrolytic graphite by hydrogen terminating, then mercurating, the peripheral carbon atoms of the surface. The modified surface can be electroplated with mercury to provide a thin, continuous, coherent film on the chemically modified surface. The resulting graphite supported mercury film is useful as an electrode, particularly for electroanalytical techniques such as anodic or cathodic stripping voltammetry.

7 Claims, No Drawings

CHEMICAL MODIFICATION OF THE SURFACE OF PYROLYTIC GRAPHITE

This invention relates to chemical modification of a carbon surface and in particular to the mercuration of peripheral carbon atoms of pyrolytic graphite. The chemically modified surface can be electroplated with mercury to provide an electrode comprising a thin, continuous, coherent mercury film supported on the chemically modified graphite surface. The electrode is useful in electroanalytical techniques, particularly anodic and cathodic stripping voltammetry.

It has now been found that a chemically modified surface of pyrolytic graphite is suitable for use as a substrate for thin continuous coherent mercury films. In accordance with this invention, the surface of pyrolytic graphite is chemically modified by (a) hydrogenating the surface to terminate peripheral carbon atoms with hydrogen, and (b) reacting the hydrogenated surface with mercury (II) ions under conditions to replace some of the terminating hydrogen atoms with mercury and thus to chemically bond mercury-containing groups to some of the peripheral carbon atoms of the graphite surface.

Graphite is a crystalline form of carbon characterized by a crystal pattern comprising parallel layers of sheet-like structures composed of interconnected planar hexagonal rings each containing six carbon atoms. The plane defined by the sheets of interconnected hexagonal rings is known as the *ab* basal plane. In the ring structure each carbon atom is linked to three equidistant carbon atoms. At the edge of each sheet are peripheral carbon atoms which are attached to only two other carbon atoms. These peripheral carbon atoms are usually terminated with a "foreign atom" such as, for example, hydrogen, oxygen or sulfur.

Pyrolytic graphite is a particular form of graphite in which the individual crystallites show definite orientation, their ab basal planes being substantially parallel to one another. While pyrolytic graphite is generally produced in block form, it can also be produced as a coating on the surface of another material, for example, conventional graphite, in a manner such that the ab basal planes of the coating are substantially parallel to the surface on which the pyrolytic graphite is formed. Pyrolytic graphite may be produced on such a surface by depositing carbon formed by pyrolysis of carbonaceous material, such as low molecular weight hydrocarbons, on the graphite surface usually at temperatures between 1,700° and 2,500°C. and at relatively low pressures. To obtain a higher degree of orientation of the crystallites, the resulting graphite structure can be subjected to further thermal treatment, optionally under stress, at elevated temperatures above the pyrolysis temperature. The graphite surface for use in this invention is composed of individual crystallites having an average size of about 100 to about 500 A, with about 90% of the crystallites being oriented with their ab basal planes parallel to the graphite surface. For use in this invention only the surface needs to be composed of crystallites oriented along the ab basal plane and thus pyrolytic graphite in block form or a base of conventional graphite coated with pyrolytic graphite as described above, can be utilized. The pyrolytic graphite coating is preferably from about 1.5 to 2 mil thick and since the coating will conform to the shape of the base, any desired configuration can be prepared.

The surface of pyrolytic graphite is pretreated to remove "foreign atoms" attached to the peripheral carbon atoms of the individual crystallites. This step can be accomplished by heating the pyrolytic graphite at temperatures of about 1,000°C. in an inert atmosphere. The pretreated graphite surface is then hydrogenated to terminate at least some of the peripheral carbon atoms with hydrogen. The hydrogenation step is carried out by known hydrogenation techniques. For example, the graphite surface, after the heating step of the pretreatment step to remove "foreign atoms," can be cooled in the inert atmosphere to a temperature of from about 625° to 725°C., and then treated with hydrogen and further cooled in an inert or hydrogen atmosphere. An alternate method of hydrogen termination of the peripheral carbon atoms comprises abrading the graphite surface while immersed in a liquid hydrocarbon having five to 20 carbon atoms, in the absence of oxygen. Illustrative liquid hydrocarbons which can be used are liquid aliphatic, aromatic, alkyl substituted aromatic and cycloaliphatic hydrocarbons, for example, hexane, benzene, toluene, cumene, cyclohexane and the like. The abrasion process removes the outermost graphite surface and results in a surface containing radical terminated peripheral carbon atoms. Each radical terminated peripheral carbon atom then abstracts a hydrogen atom from the hydrocarbon, forming hydrogen terminated peripheral carbon atoms on the surface.

The resulting hydrogenated graphite surface is then treated with mercury (II) ions under conditions similar to those for mercuration of aromatic hydrocarbons. These conditions are similar to those for electrophilic substitution by mercuric ions. A typical method for this mercuration is to contact the hydrogenated graphite surface with a solution of a mercury (II) salt, such as acetate, nitrate or perchlorate, in a suitable reaction medium for electrophilic substitution reactions. Reaction media which can be used include acids such as acetic, acetic-perchloric, trifluoroacetic and methane sulfonic acid. The presence of water reduces the rate of reaction of the mercury (II) ions with the hydrogenated surface. Acid anhydrides can be added to the acid solution to reduce this effect of water. The mercuration is continued until from about $9 \times 10^{-12}$ to about $1.3 \times 10^{-9}$ grams atoms of mercury-containing groups per geometric square centimeter of graphite surface have replaced some of the terminating hydrogen atoms to become chemically bound to peripheral carbon atoms. The time required for this degree of mercuration varies with the reaction system used. In general, a solution of mercury (II) ions in acidic solvents requires from about 5 minutes to about 30 minutes in contact with the graphite surface. The mercurated surface then is washed with water and an aqueous solution containing complexing ions such as chloride ions to solubilize and remove any physically occluded mercury (II) ions. Other known methods of mercuration of aromatic hydrocarbons can also be used. The hydrogen terminated-mercurated graphite surface is stable to oxidation and can be stored in this form for subsequent use.

The hydrogen-terminated, mercurated graphite surface of this invention can be used as a conductive support for a thin, continuous, coherent mercury film to produce an electrode. The mercury film is produced on the modified graphite surface by electrodeposition of mercury (II) ions from an aqueous solution. The chemically bound mercury-containing groups serve as nucleation sites for the electrodeposition of mercury on the modified graphite surface. The electroplating solution comprises an aqueous solution of mercury ions or complexed ions prepared by dissolving a mercury salt such as the acetate, nitrate or perchlorate in aqueous medium. A salt ionizable in aqueous solution is added to increase the conductivity for the electrodeposition process and to prevent hydrolysis of the mercury salt. Such ionizable salts include potassium chloride, sodium chloride, calcium nitrate and any other water soluble salt with cations which are not readily reducible.

To perform the electrodeposition, the electroplating solution is placed in an electrolytic cell with the hydrogen terminated-mercurated graphite surface as the cathode, a reference electrode, such as saturated calomel or silver-silver chloride reference electrode, and an auxiliary or counter electrode as the anode. The counter electrode permits the passage of higher currents through through the electrolytic cell at a given potential. To effect electrodeposition, the graphite surface is potentiostatted at a potential negative with respect to the reference and counter electrodes. Potentials from about $-0.5$ to about $-1.0$ volts versus the reference electrode are preferred. The graphite surface is maintained at the negative potential for a period of time sufficient to deposit between about $1.4 \times 10^{-4}$ and $2.8 \times 10^{-3}$ grams of mercury per square centimeter of exposed graphite surface. The thickness of the mercury film thus deposited varies from about 0.1 to about 2 microns. The electroplating solution is then removed. An aqueous solution of an ionizable salt, for example, the same salt that was used to increase the conductivity of the electroplating solution, is added to the electrolytic cell. The graphite surface is again potentiostatted at a negative potential with respect to the reference electrode to reduce any physically absorbed or occluded mercury ions. The resulting structure comprises a thin, continuous, coherent film of mercury supported on a hydrogen-terminated, mercurated graphite substrate and can be used as an electrode. The thin mercury layer has excellent sensitivity, reproducibility and resolution for use as an electrode in electroanalytical methods, including conventional anodic and cathodic stripping voltammetry, as well as other voltammetric methods depending on current, potential and time dependencies. Such electrodes can also be used for preparative electrochemical syntheses. The mercury film so produced is stable for several days if kept in contact with oxygen-free water, but rapidly degrades if dried and stored in air.

The carbon supported mercury films are particularly useful as the working electrode in conventional anodic or cathodic stripping voltammetry. In this method of analysis electrodeposition of the ions to be analyzed is carried out under carefully controlled conditions of stirring rate and time. Only a small fraction of the electroactive species is removed from the sample, the amount being dependent on the concentration of the sample and the diffusion rate under the conditions employed. After the deposition period has been completed, the potential is then varied in the direction required for oxidation or reduction of the electrodeposited material while concomitantly measuring the resulting current. The magnitude of the current at an appropriate voltage provides a measure of the amount deposited which is proportional to that present in the sample. Standard solutions must be employed to relate the measured current to the sample solution concentration.

The following examples are illustrative of the preparation of the hydrogen-terminated, mercurated graphite surfaces of this invention and their use in preparing electrodes by forming a thin continuous, coherent mercury film by electrodeposition on said modified graphite surface and the use of such electrodes in conventional anodic stripping analysis.

EXAMPLE 1

This example illustrates the preparation of a hydrogen-terminated, mercurated planar pyrolytic graphite surface.

An ab basal plane surface of a pyrolytic graphite cylinder, 1.25 centimeters in diameter and 1.25 centimeters in length, having the ab basal plane oriented perpendicular to the cylinder axis, was abraded using hand pressure for about one minute at room temperature on a 5 cm. × 5 cm. porcelain plate in 25 milliliters of deoxygenated toluene in a sealed polyethylene bag containing a nitrogen atmosphere. After the graphite had remained in the toluene for two hours, it was removed, washed with fresh toluene and dried by evacuation. The hydrogen terminated pyrolytic graphite cylinder was placed in 25 milliliters of a solution containing 0.1 M mercuric perchlorate in 80% (V/V) trifluoroacetic acid – 20 (V/V) trifluoroacetic anhydride for 15 minutes. The pyrolytic graphite cylinder was next washed with distilled water until the water washings were of neutral pH and then rinsed four times with 20 milliliters of an aqueous 2 M KCl solution. The mercurated graphite was again rinsed with distilled water and vacuum dried.

EXAMPLE 2

This example illustrates the preparation of an electrode comprising a continuous mercury film on the hydrogen-terminated mercurated planar pyrolytic graphite surface prepared in Example 1.

A graphite disc, 1.25 cm. in diameter and about 0.1 cm. thick, was prepared by splitting off one of the abraded, mercurated ends of the graphite cylinder of Example 1 by cleavage with a razor blade. The graphite disc was placed in a polytetrafluoroethylene holder such that the hydrogen terminated mercurated flat surface was exposed. A vinyl adhesive tape annulus was then used to attach the graphite disc to the polytetrafluoroethylene holder, exposing 0.44 cm$^2$ of the graphite. Electrical contact was made to the graphite disc by means of a platinum wire and a small amount of mercury added to the back side of the graphite disc. The graphite disc mounted in the holder was then placed in a Pyrex$^{TM}$ (trademark of Corning Glass Works) electrolysis cell containing 10 ml. of an aqueous 1 M KCl solution containing $1 \times 10^{-3}$ M mercuric acetate. The electrolysis cell also contained a platinum wire counter electrode, a saturated calomel reference electrode (SCE), a magnetic stir bar and a polytetrafluoroethylene tube for nitrogen sparging. The electrolysis cell was completely deoxygenated, then the graphite disc was potentiostatted at $-1.0$ volt versus the saturated calomel electrode and 0.45 coulomb of electricity was passed through the cell over a period of 20 minutes. The resulting mercury film was calculated to be 0.8 micron thick, assuming a smooth surface on the exposed graphite surface.

EXAMPLE 3

This example illustrates the preparation of a hydrogen-terminated, mercurated nonplanar pyrolytic graphite surface.

A graphite tube having a pyrolytic graphite coating 1.5 to 2.0 mils thick on the interior and exterior surfaces and having the ab basal plane primarily parallel to the tube surfaces was heated at 1,000°C. for 3 hours in a Vycor$^{TM}$ (trademark of Corning Glass Works) tube in a highly purified argon stream to effect radical termination of the graphite surface. The tube, 2.54 cm. in length by 1.27 cm. in internal diameter, was then cooled to 675°C. and exposed to highly purified hydrogen gas for 18 hours. The tube was then cooled to room temperature under hydrogen and stored under vacuum for further use. The hydrogen terminated pyrolytic graphite coated graphite tube was then placed in a 0.1 M mercuric perchlorate – 80% (V/V) trifluoroacetic acid – 20% (V/V) trifluoroacetic anhydride solution for 15 minutes. The tube was then washed with distilled water until the water washings were of neutral pH and rinsed four times with 20 ml. of an aqueous 2 M KCl solution. The graphite tube was rinsed with distilled water and vacuum dried. The resulting hydrogen-terminated mercurated graphite surface was stable and the tube was stored for subsequent use.

EXAMPLE 4

This example illustrates the application of a thin, continuous, coherent, mercury film on the hydrogen-terminated, mercurated cylindrical pyrolytic graphite surface prepared in Example 3.

One end of the mercurated graphite tube was sealed with paraffin wax. The tube was then mounted into a ¾ inch Swagelok$^{TM}$ (trademark of Crawford Fitting Company) union with conventional aluminum ferrules and nut. The Swagelok$^{TM}$ union was then attached to a shaft rotatable at 600 rpm with a synchronous motor. A solution of 2.0 ml. of an aqueous 0.5 M KCl solution containing 0.025 M mercuric acetate was added to the graphite tube. A saturated calomel reference electrode (SCE), a platinum wire spiral counter electrode and a polytetrafluoroethylene nitrogen sparge tube were also included, and the system was deoxygenated with nitrogen. The graphite tube was potentiostatted at −1.0 volt versus the saturated calomel reference electrode and 6 coulombs of electricity was passed through the cell over a period of 2 minutes. The plating solution was then removed and 2.0 ml. of 1 M potassium chloride was added to the graphite tube. After deoxygenating with nitrogen, the tube was again potentiostatted at −1.0 volt versus the saturated calomel reference electrode for 60 seconds to reduce any mercury ions remaining on the surface. The thickness of the mercury film was calculated to be 0.5 micron, assuming the geometrical area of the tube, 9.5 cm$^2$, to be smooth. The resulting structure was a graphite tube having a thin, continuous, coherent mercury film plated on the interior cylindrical chemically modified graphite surface.

EXAMPLE 5

This example illustrates the use of the electrode prepared in Example 2 in conventional anodic stripping analysis.

The graphite disc of 0.44 cm$^2$ working area mounted in the polytetrafluoroethylene holder and containing a thin, continuous coherent mercury film, prepared as described in Example 2, was used as the working electrode for conventional anodic stripping analysis. Five ml. of a standard solution containing 50 ppb. lead (II) ions and 50 ppb. cadmium (II) ions was added to a Pyrex$^{TM}$ electrolysis cell as was used for the electroplating step in Example 2. To the electrolysis cell was added through a polytetrafluoroethylene top, the electrode prepared in Example 2, a platinum wire counter electrode, a saturated calomel reference electrode (SCE), a magnetic stir bar and a polytetrafluoroethylene tube for nitrogen sparge. Following a 5 minute deoxygenation period, the pyrolytic graphite-mercury film disc electrode was potentiostatted at −1.0 volt versus the SCE for exactly 10 minutes with the magnetic stir bar rotating at constant speed. After the completion of the 10 minute deposition step, the electrode was scanned toward positive potentials at a rate of 2 volts per minute. The resulting current-potential trace depicted two Gaussian-shaped peaks with peak currents of 43 microamperes and 41 microamperes for lead and cadmium respectively. The peak potentials were −0.41 and −0.61 volt versus the SCE for lead and cadmium, respectively. Using different concentrations of lead and cadmium down to 5 ppb., a standard curve was obtained whose peak current-concentration response relationship was 0.86 microampere/ppb. and 1.1 microampere/ppb. for cadmium and lead respectively. These response factors then were applied to the analysis of samples containing lead and cadmium in unknown amounts in the range of 2 to 100 pbb. using the same cell, sample size, stirring rate, deposition period and stripping rate as used in the analysis of the standard solutions.

What I claim and desire to protect by Letters Patent is:

1. The process of chemically modifying the surface of pyrolytic graphite which comprises (a) hydrogenating the surface to terminate peripheral carbon atoms with hydrogen, and (b) mercurating the hydrogenated surface by contacting said surface with a solution of a mercury (II) salt selected from the group consisting of mercuric acetate, nitrate and perchlorate in an acidic reaction medium selected from the group consisting of acetic, acetic-perchloric, trifluoroacetic and methane sulfonic acids and mixtures of said acids with the anhydrides thereof to replace some of the terminating hydrogen atoms with mercury (II)-containing groups and thus to chemically bond mercury to some of the peripheral carbon atoms of the graphite surface.

2. The process of claim 1 in which the hydrogenation step is accomplished by heating pyrolytic graphite to a temperature of about 1,000°C. in an inert atmosphere, cooling to about 625° to about 725°C., treating with hydrogen, and cooling in an inert atmosphere.

3. The process of claim 1 in which the hydrogenation step is accomplished by abrading the surface of pyrolytic graphite in a liquid hydrocarbon having five to 20 carbon atoms in the absence of oxygen.

4. The process of claim 1 in which the hydrogenated surface is contacted with said solution of a mercury (II) salt for a period of time sufficient to bond to said surface from about $9 \times 10^{-12}$ to about $1.3 \times 10^{-9}$ gram atoms of mercury per geometric square centimeter of said surface.

5. The process of claim 4 in which the mercury (II) salt is mercuric perchlorate and the reaction medium is a mixture of trifluoracetic acid and trifluoroacetic anhydride.

6. An article having a surface of pyrolytic graphite containing mercury (II)-containing groups chemically bonded to some of the peripheral carbon atoms of said surface.

7. The article of claim 6 in which the amount of mercury in said mercury (II)-containing groups is from about $9 \times 10^{-12}$ to about $1.3 \times 10^{-9}$ gram atoms of mercury per geometric square centimeter of said surface.

* * * * *